United States Patent [19]
White

[11] Patent Number: 5,900,918
[45] Date of Patent: May 4, 1999

[54] ADJUSTABLE VIDEO GAMMA CIRCUIT

[75] Inventor: Charles M. White, Escondido, Calif.

[73] Assignee: Hughes-JVC Technology Corporation, Carlsbad, Calif.

[21] Appl. No.: 08/902,593

[22] Filed: Jul. 30, 1997

[51] Int. Cl.⁶ .................................................. H04N 5/202
[52] U.S. Cl. .......................................... 348/674; 348/744
[58] Field of Search .................................... 348/674, 675, 348/677, 744, 254, 676; 382/167; 345/147

[56] References Cited

U.S. PATENT DOCUMENTS

| | | |
|---|---|---|
| 3,708,693 | 1/1973 | Ferrier et al. . |
| 4,489,349 | 12/1984 | Okada ..................................... 358/168 |
| 4,738,514 | 4/1988 | Stewart . |
| 4,847,524 | 7/1989 | Van Rooy et al. . |
| 4,868,668 | 9/1989 | Tavernetti . |
| 5,251,017 | 10/1993 | Riviere . |
| 5,461,430 | 10/1995 | Hagerman . |
| 5,610,666 | 3/1997 | Ueda et al. ............................... 348/676 |

FOREIGN PATENT DOCUMENTS

| | | |
|---|---|---|
| 57-155884 | 9/1982 | Japan . |
| 59-45775 | 3/1984 | Japan . |
| 59-67784 | 4/1984 | Japan . |
| 60-257674 | 12/1985 | Japan . |
| 62-112479 | 5/1987 | Japan . |
| 2-260976 | 10/1990 | Japan . |
| 3-91375 | 4/1991 | Japan . |
| 3-186071 | 8/1991 | Japan . |
| 4-351071 | 12/1992 | Japan . |

OTHER PUBLICATIONS

"Analog Gamma Compensation Circuit For Liquid Crystal Display," Dec. 1, 1994, IBM Technical Disclosure Bulletin, vol. 37, NR 12, pp. 87/88.

*Primary Examiner*—Victor R. Kostak
*Attorney, Agent, or Firm*—Harness, Dickey & Pierce, P.L.C.

[57] ABSTRACT

An adjustable gamma correction circuit that is operative to adjust grey scale distortion in a projected video signal by dynamically changing the gamma transfer function without the need to reset projector high and low amplification thresholds. The circuit includes both a linear amplification stage and a non-linear amplification stage that function to reshape the projector transfer function. At the non-linear stage consists of two pairs of emitter coupled amplifiers set at different voltage thresholds. The two pairs of emitter coupled transistors allow adjustment of the grey level of the circuit transfer function to thereby compensate for mid-level variations in the projector transfer function, thereby resulting in improved projected image quality.

20 Claims, 7 Drawing Sheets

ADJUSTABLE VIDEO GAMMA CIRCUIT

BACKGROUND OF THE INVENTION

1. Technical Field

The present invention relates generally to video projection systems, and more particularly to a gamma correction circuit that adjusts the grey scale distortion in a projected video signal by dynamically changing the projector system gamma transfer function without the need to reset the projector system high and low threshold levels.

2. Discussion

Conventional video display devices exhibit a non-linear light input to light output, or gamma, relationship. Particularly, in liquid crystal light valve (LCLV) projectors, the associated light valves exhibit a non-linear characteristic that is in addition to the normal gamma characteristic of the cathode ray tube used to illuminate the photo sensitive side of the light valve. The resulting output of the video display devices often include color errors caused by imbalances of the above mentioned system gamma characteristics.

Conventional video projectors include controls to adjust video offsets and gains between black and white light levels to correct projector grey scale linearity. Projector grey scale linearity must be maintained, as a projector having an unbalanced or nonlinear grey scale characteristics projects images with fewer shades of grey, thus causing the images to look "washed-out" or "over-saturated" and have poor color qualities. While conventional video projectors are set-up based on low and high level adjustments, errors still exist at the mid-grey levels. An existing gamma correction circuit is disclosed in U.S. Pat. No. 5,461,430 to Hagerman (the "Hagerman patent") which is assigned to the assignee of the present invention and incorporated herein by reference. The gamma correction circuit in the Hagerman patent predistorts the video wave forms to match the general nonlinearity characteristics of the system to correct the nonlinearities associated with the individual light valves and the projector CRT. The circuit in the Hagerman patent primarily corrects the low and high extremes of the gamma function.

While the above gamma correction circuit provides adequate performance characteristics, there is still a need for improvement in the art. Specifically, there is a need for a gamma correction circuit for video display devices that is adjustable to compensate for individual variations in the projector light valves and CRTs. In addition, there is a need for the gamma correction circuit that may be adjusted to affect the nonlinearity compensation in the middle grey scale levels without affecting the low and high levels and therefore minimizes reiteration of projector set-up routines.

SUMMARY OF THE INVENTION

Accordingly, the present invention provides an analog gamma correction circuit that provides for gamma correction in image projectors and particularly liquid crystal light valve video projectors. The gamma correction circuit of the present invention implements a non-linear system transfer function, thereby providing the non-linear function that compensates for the inherent nonlinearities associated with projector light valves and image sources, such as cathode ray tubes.

The gamma correction circuit of the present invention allows mid-grey scale correction in a video projector system without the need for projector set-up to be repeated, as the gamma correction circuit of the present invention does not significantly affect the low and high compensation level characteristics. In particular, the gamma correction circuit of the present invention includes a linear amplification stage that provides linear gain to the video signal. The circuit also includes a non-linear amplification stage that sets the slope of the mid-level gain. The circuit output is summed with both the linear and non-linear stages, and it outputs the adjusted video signal after the signal is amplified by both the linear and non-linear stages. The non-linear stage is adjustable between the low and high settings to compensate for differences in the characteristics of the three color channels without necessitating the need for a reiterative projector set-up, as adjustment of the non-linear stage does not affect low and high circuit compensation levels.

Preferably, the non-linear stage implemented in the gamma correction circuit of the present invention comprises first and second pairs of emitter coupled transistors that, in combination with a DC bias voltage, set the high and low adjustable threshold values of the middle portion of the associated gamma correction curve. The non-linear stage, when coupled with the linear stage, and additional circuit components, allows the transfer function to be adjusted to tailor the circuit to components for individual projector light non-uniformities.

Other objects, features and advantages will be readily apparent from the foregoing specification, drawings and claims.

DETAILED DESCRIPTION OF THE INVENTION

Figure 1:
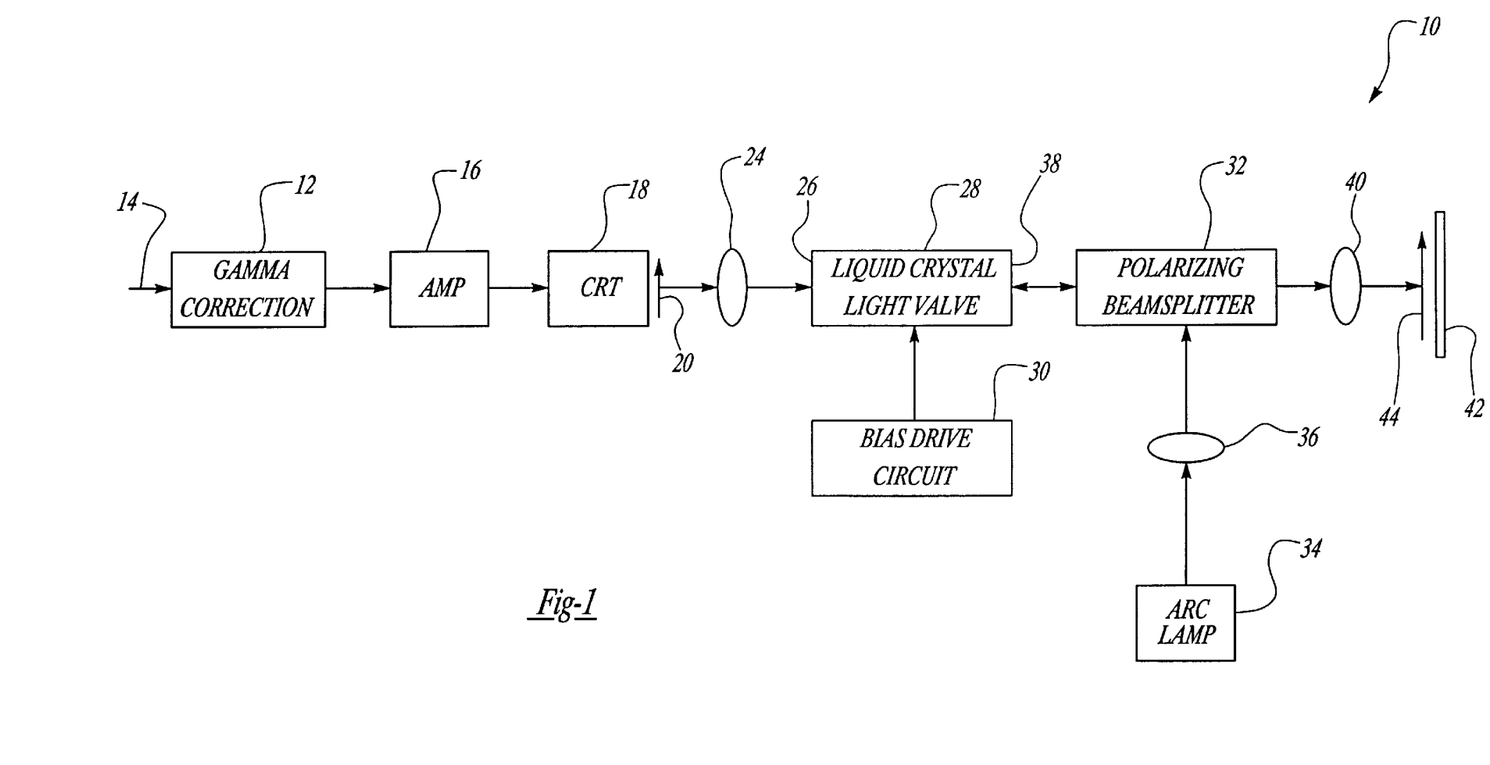
FIG. 1 is a block schematic diagram of a video projector in which the gamma correction circuit of the present invention is implemented.

FIG. 1 illustrates the components of a conventional liquid crystal light valve image projector 10 including a gamma correction circuit 12 according to a preferred embodiment of the present invention. Although the following description refers specifically to the liquid crystal light valve image projector 10, it will be appreciated by those skilled in the art that the gamma correction circuit 12 may be utilized with any non-linear light modulator or image projector requiring correction for grey level light amplification non-uniformities.

The projector 10, in addition to the gamma correction circuit 12, includes a signal input 14 through which a video signal is input into the gamma correction circuit 12. The gamma correction circuit 12 is coupled to an amplifier 16, which in turn is coupled to an input of a cathode ray tube (CRT) 18. The amplifier 16 provides a gain stage that increases the strength of the signal output from the gamma correction circuit prior to its input to the CRT 18. The CRT generates and outputs an image 20 to be displayed by the projector 10. A relay lens 24 in optical alignment with the CRT 18 focuses the image 20 on an input surface 26 of a liquid crystal light valve 28. A bias drive circuit 30 drives the liquid crystal light valve 28 and thus controls the output of the liquid crystal light valve.

A polarizing beam splitter 32 is optically aligned with the liquid crystal light valve 28 and transfers light generated from an arc lamp 34 that is focused onto the beam splitter via focusing lens 36. The light is reflected from an output surface 38 of the liquid crystal light valve back through the polarizing beam splitter. The image 20 is thus transferred by the liquid crystal light valve to the light provided by the arc lamp 34. A projection lens 40 images the reflected light including the image onto an image screen 42. The image screen displays an image 44, which is a replication of the image 20, for viewing purposes.

It should be appreciated that the above video projector, except for the gamma correction circuit 12, is of the type well known in the art. Preferably, the video projector is a Model 200 or Model 300 liquid crystal light valve image projector manufactured by Hughes JVC Technology Corporation, the assignee of the present invention.

Figures 4A, 4B:
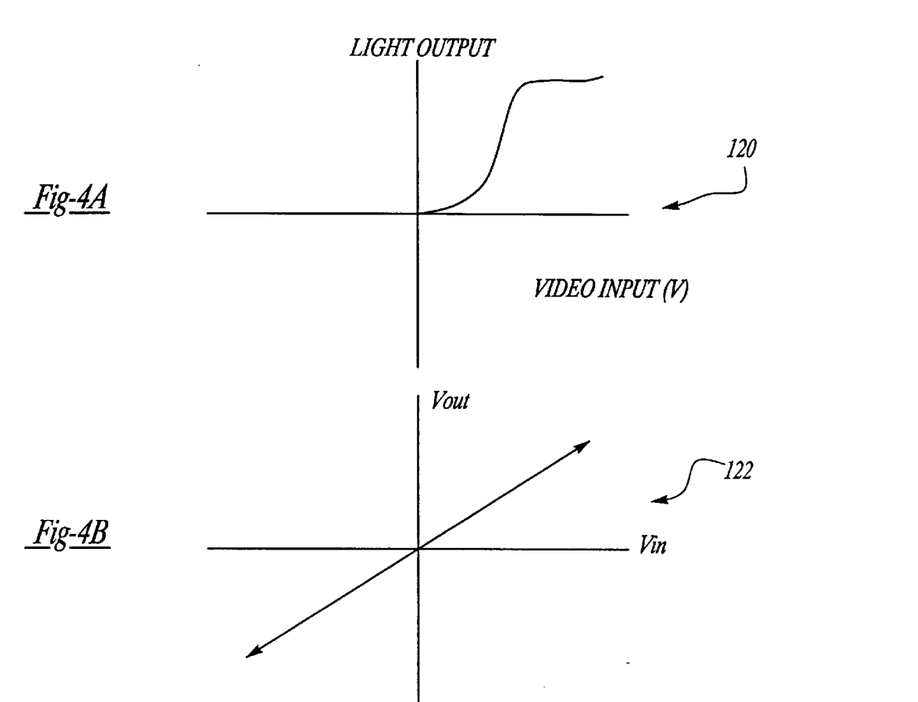
FIG. 4A is a response curve of light output vs voltage of both the CRT & LCLV of a video projector.
FIG. 4B is a response curve of voltage input vs voltage output for a linear stage of the gamma correction circuit of the present invention.

In operation, the CRT applies the image 20 to the input side of the liquid crystal light valve 28. The input side 26 of the liquid crystal light valve effectively functions as a variable mirror that reflects varying amounts of light provided by the arc lamp 34, thereby effectively creating a light amplifier. In combination, the CRT 18 and the LCLV 28 effectively amplify the image 20. The image 20 is amplified, without the gamma correction circuit 12, in accordance with a transfer function associated with the CRT 18 and the LCLV 28 combination, as indicated by the transfer function in FIG. 4A. It is necessary to correct grey scale non-uniformities through adjustment of the transfer function, to insure that the projected image 44 is projected with a high image quality.

Figure 2:
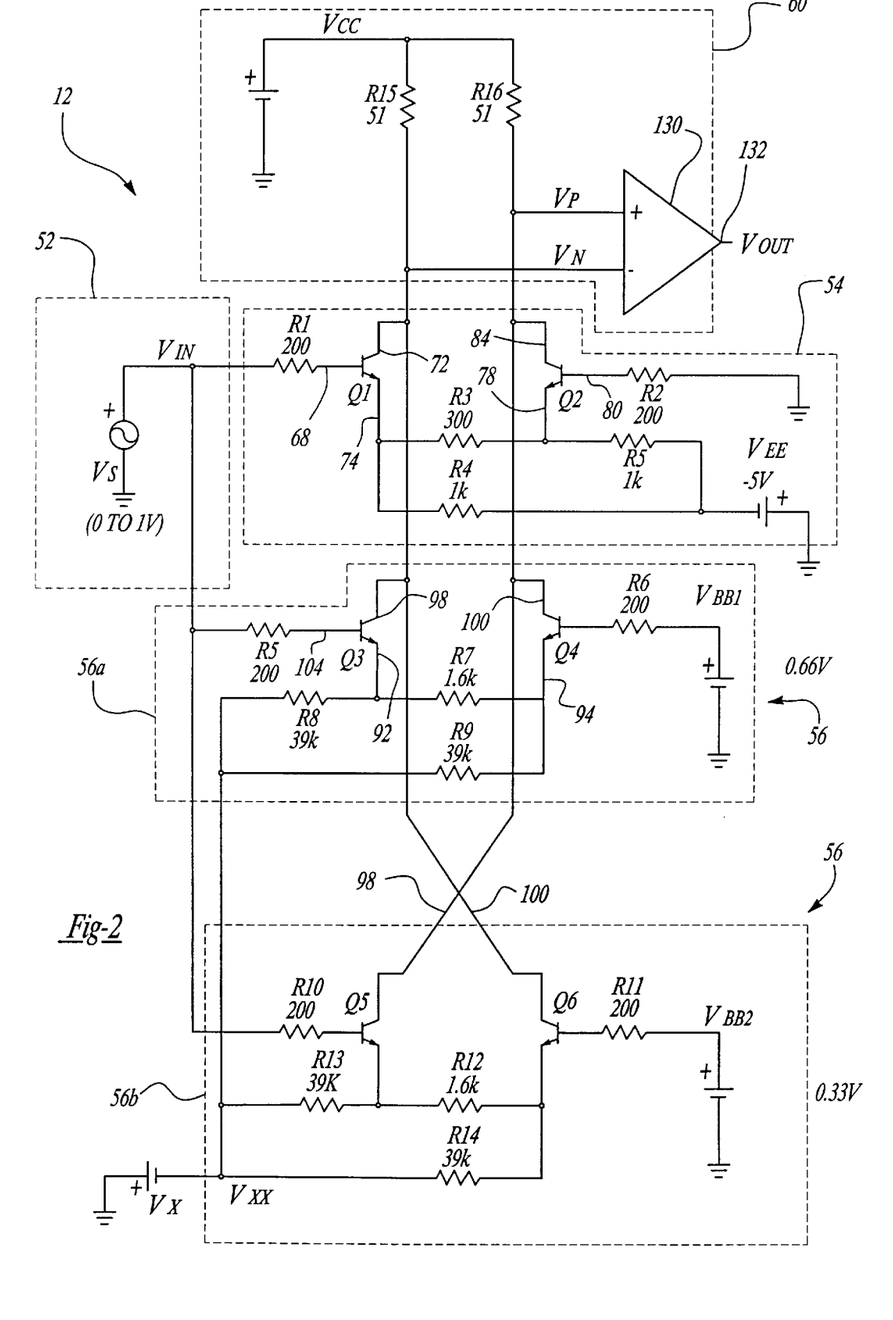
FIG. 2 is a circuit diagram of the gamma correction circuit of the present invention.
Figure 3A:
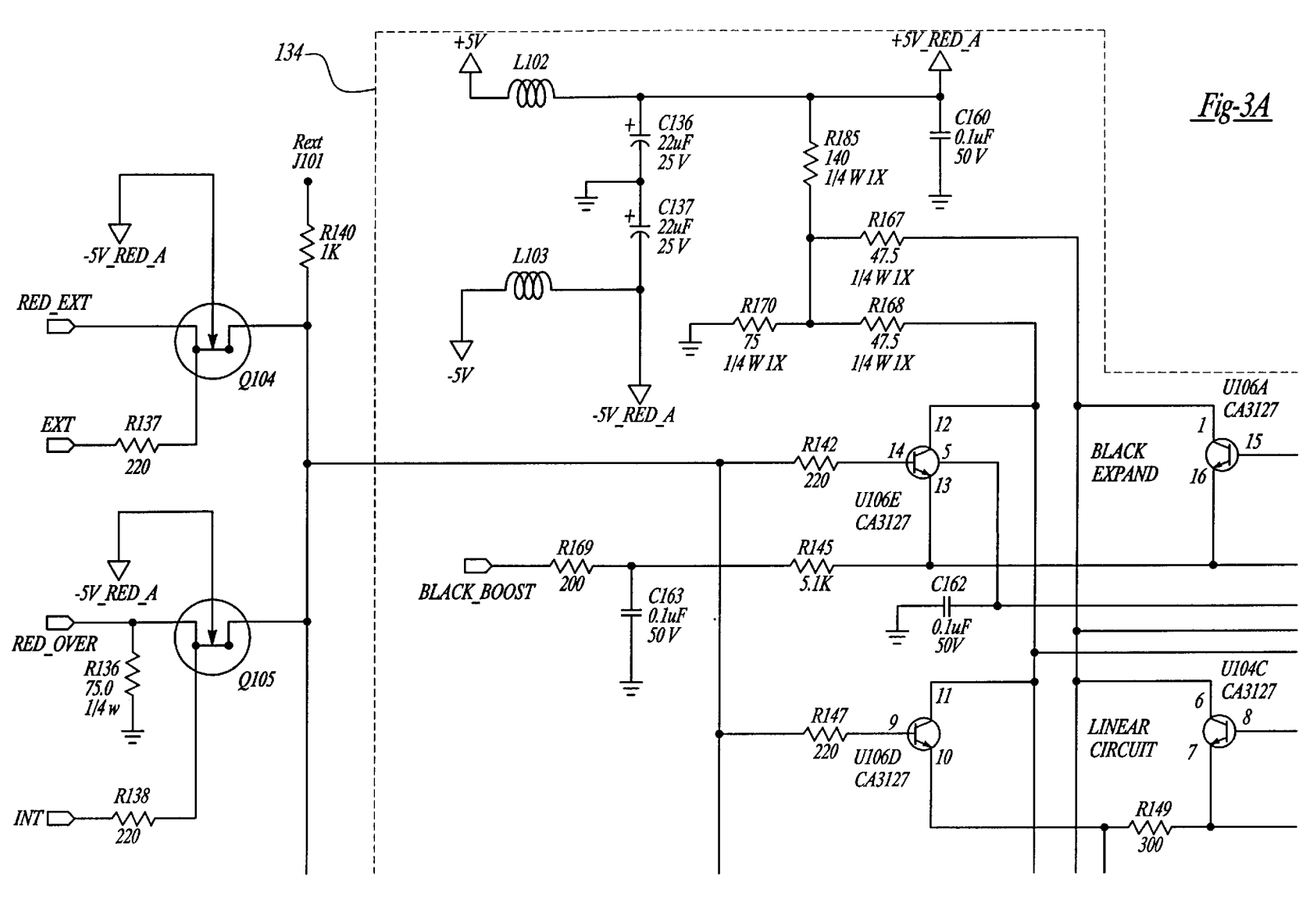
FIG. 3 is a circuit diagram or the gamma correction circuit of the present invention implemented in conjunction with a conventional video projector processor.
Figure 3B:
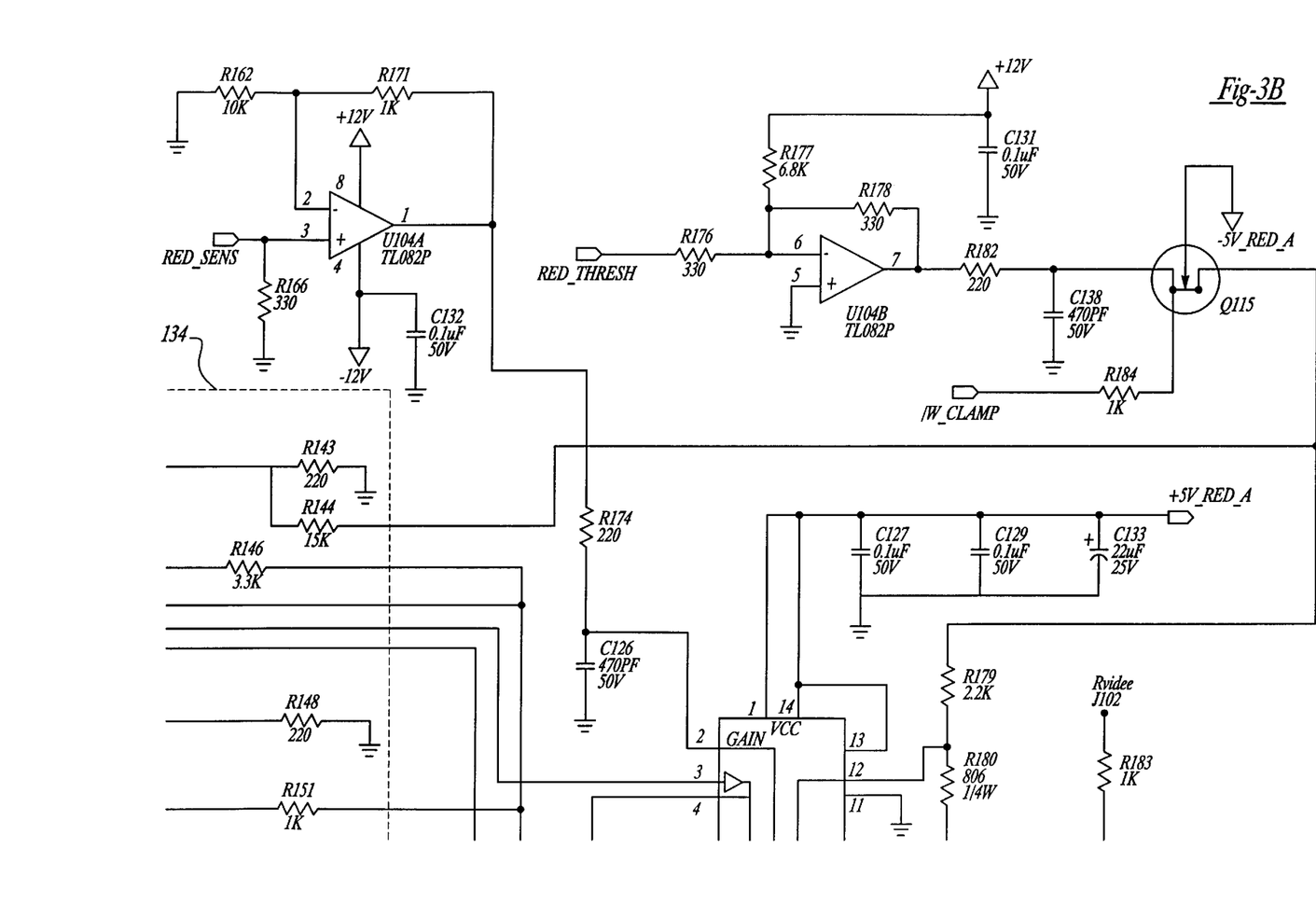
Figure 3C:
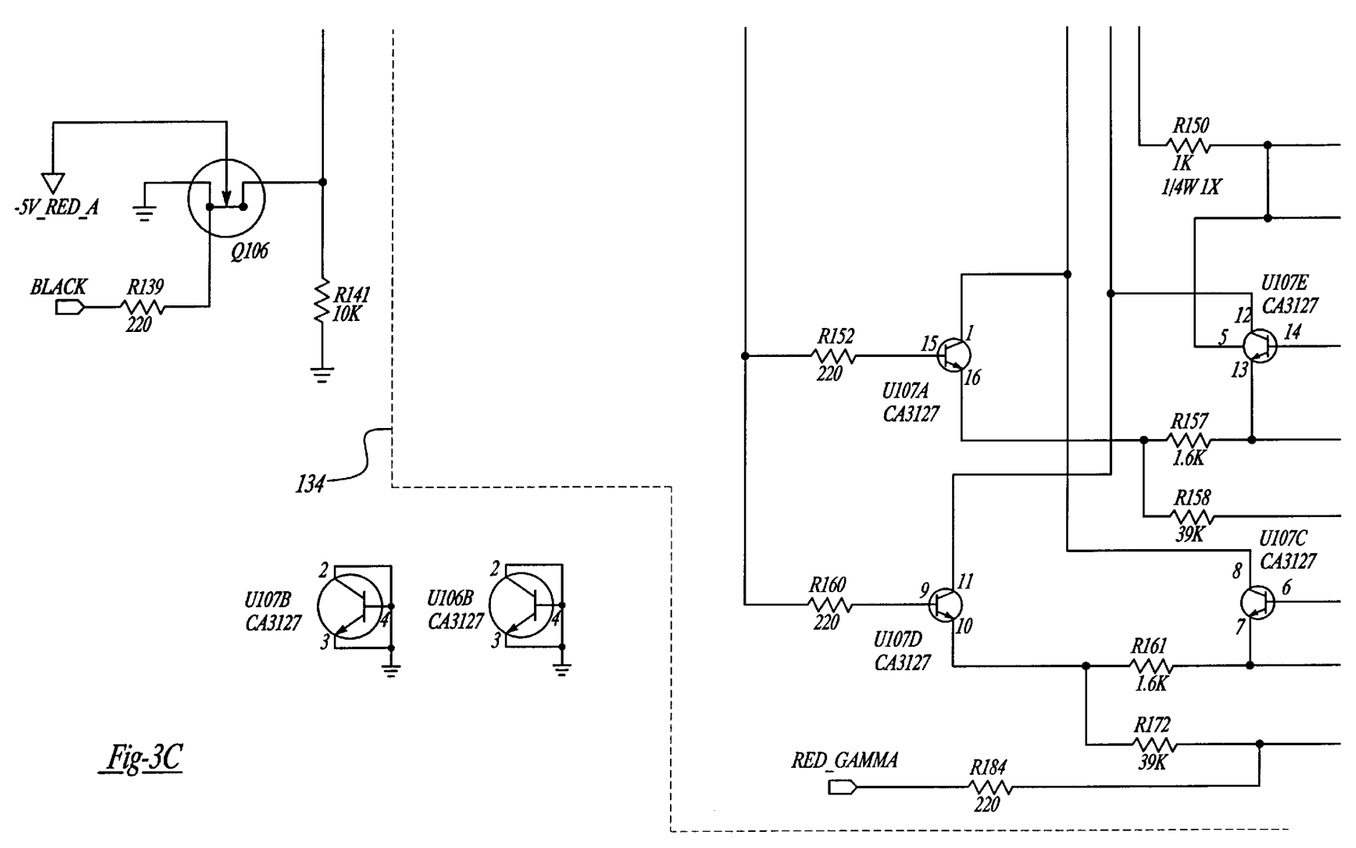
Figure 3D:
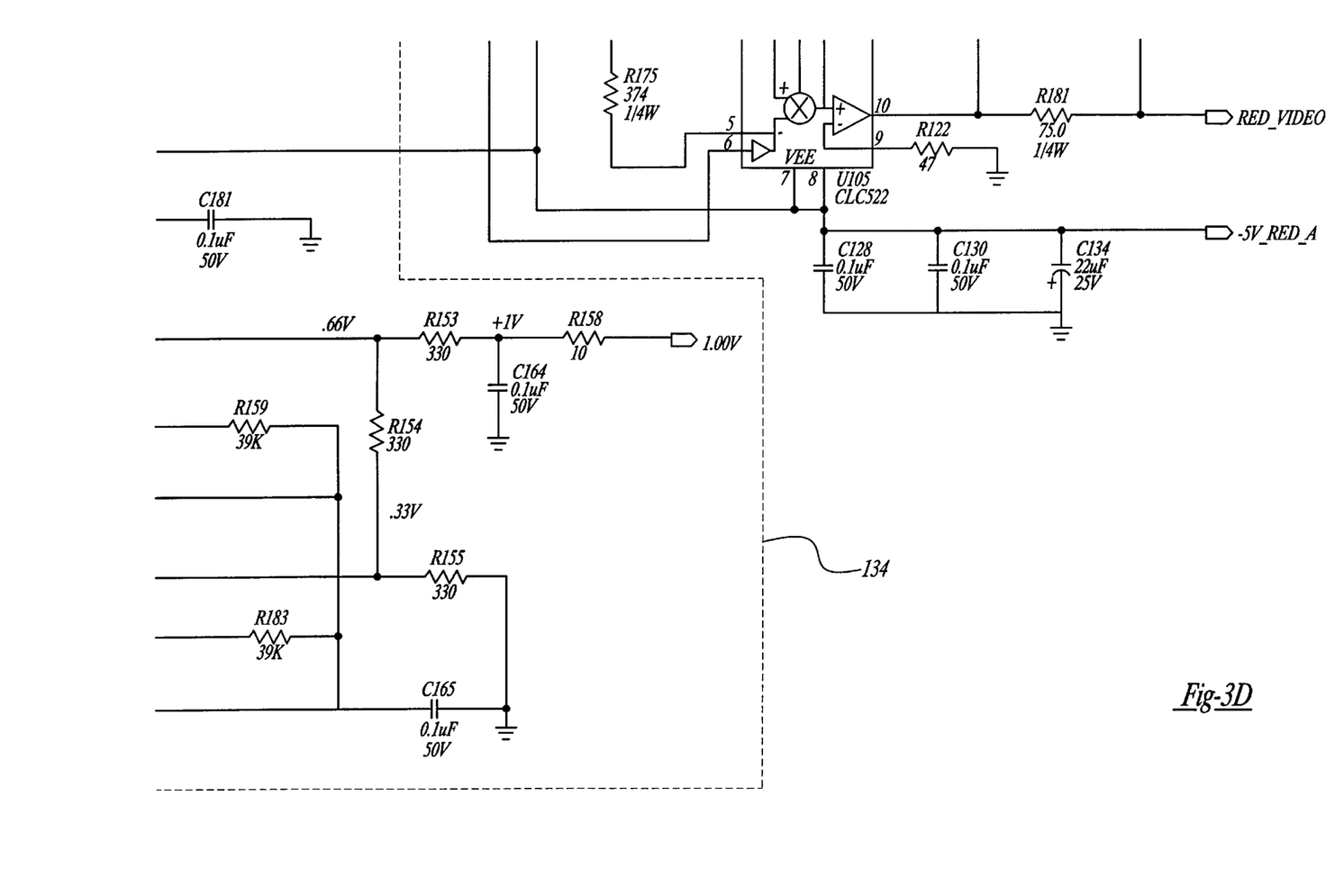

Referring to FIG. 2, the gamma correction circuit 12 according to a preferred embodiment of the present invention is shown in detail. The gamma correction circuit includes a signal input stage 52, a linear amplification stage 54, a non-linear amplification stage 56, and a signal output stage 60. As will be described in detail below, the linear and non-linear stages 54, 56 in combination modify the projector transfer function to provide gain not only at the black and white light levels but also in the middle, or grey, levels to provide correct light levels across the entire grey scale on the input surface 26 of the liquid crystal light valve 28.

Still referring to FIG. 2, the circuit input stage 52 receives a video signal at the projector input 14 from a video source, such as a video tape recorder (not shown). As shown, the circuit input stage 52 applies a non attenuated version of the input signal to both the linear stage 54 and the non-linear stage 56. The signal is input into both stages 54, 56 in a non attenuated manner in order to achieve the desired circuit input/output transfer function discussed below.

The linear stage 54 includes first and second emitter coupled transistors Q1, Q2. The transistor Q1 includes a base 68 coupled to the circuit input stage via a resistor R1, which prevents parasitic oscillations. The transistor collector 72 is coupled to the circuit output stage 60, while its emitter 74 is coupled to the DC voltage source $V_{EE}$ through resistor R4. The emitter 74 also is coupled to emitter 78 of the transistor Q2 through resistor R3. The resistor R3, in combination with resistors R15 and R16 of the output stage 60, sets the gain of the circuit 12. Resistor R3 is an emitter degeneration resistor that determines that the signal voltage to current relationship, while resistors R4, R5 supply bias current from DC voltage source $V_{EE}$ to maintain Q1, Q2 in linear operation over the entire input voltage range of input voltage $V_s$.

As with the transistor Q1, the transistor Q2 includes a base 80 coupled to ground through a base resistor R2, which prevents parasitic oscillation of the transistor Q2. The transistor collector 84 is coupled to the circuit output stage 60. The transistor emitter, in addition to being coupled to the emitter 74, is also coupled to DC voltage source $V_{EE}$ through resistor R5. The voltage source $V_{EE}$ sets the bias voltage for the linear stage 54 and, in combination with resistors R4, R5, determines the slope of the transfer function associated with the linear stage.

Figure 4C:
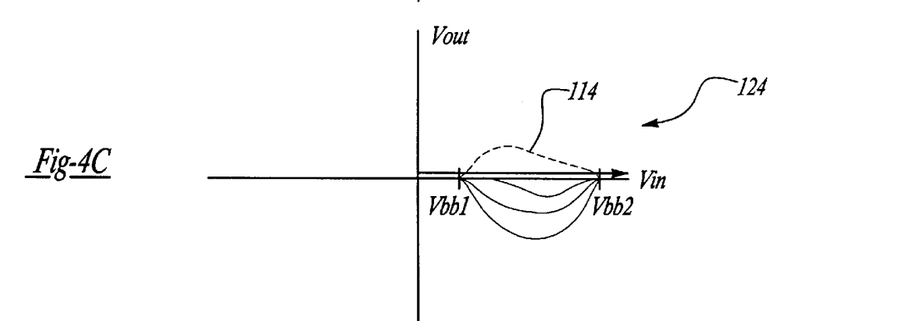
FIG. 4C is a response curve of voltage input vs voltage output for a non-linear stage of the gamma correction circuit of the present invention.
Figure 4D:
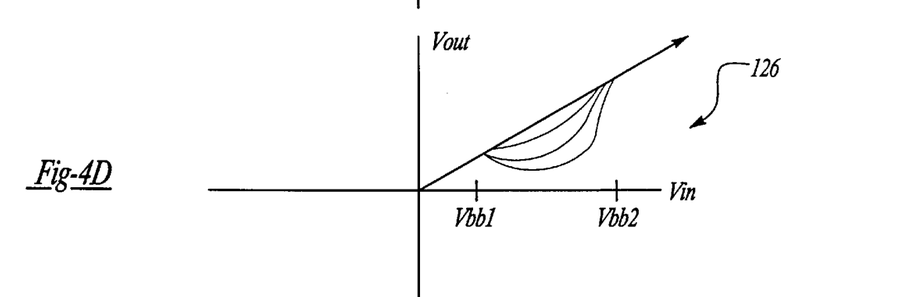
FIG. 4D is a response curve of voltage input vs voltage output for the combination of the linear and non-linear stages of the gamma correction circuit of the present invention.

Still referring to FIG. 2, the non-linear stage 56 of the gamma circuit 12 will now be described. The non-linear stage 56 includes two non-linear circuits 56a, 56b that each include a pair of emitter coupled transistors: Q3, Q4 and Q5, Q6, respectively. The transistors Q3, Q4 have emitters 92, 94 coupled to one another via a resistor R7. The resistor R7 sets the slope of the mid-level gain contribution of the transistor pair Q3, Q4. The collectors 98, 100 of the transistors Q3, Q4 are each coupled to the output stage 60. The base 104 of the transistor Q3 is coupled to the input stage 52 via a resistor R5 that prevents parasitic oscillation. The base 110 of the transistor Q4 is connected to DC bias voltage source $V_{bb1}$, which is preferably 0.66 volts. Both the emitters 92, 94 are also connected to voltage source $V_X$ through resistors R8, R9. The voltage source $V_X$ provides a DC bias voltage to the transistor pair Q3, Q4. Voltage source $V_X$ controls the shape of the circuit transfer function in the mid-level range. For example, when $V_X$ is negative, the non-linear stage consisting of transistor pair Q3, Q4 gets more current and therefore the curve in the grey level becomes more negative, as indicated at 112 in FIG. 4C. The amount of voltage supplied by voltage source $V_X$ may be controlled by a projector processor (not shown) during the projector set-up, as is well known in the art.

According to a preferred embodiment of the present invention, $V_{BB1}+V_{BB2}=100\%$ video white level (black=0%). This ensures the non-linear function acts primarily around the 50% grey level.

Still referring to FIG. 2, the second non-linear circuit 56b is configured identically to the first non-linear circuit 56a. In a preferred embodiment of the present invention, the transistors and resistors are identical to those in the first non-linear circuit. The second non-linear circuit differs, however, from the first non-linear circuit in that the bias voltage source, $V_{bb2}$, provides an output voltage that is lower than voltage source $V_{bb1}$. By setting the thresholds differently for Q3, Q4 and Q5, Q6 pairs, overall gain is first reduced and then increased, but cancels entirely at 20 IRE and 80 IRE, which are the preferable threshold points for the gamma curve. Thus, the DC voltage $V_{XX}$ controls how much the circuit signal deviates from linear in the region where the adjustable gamma circuit is operating, while the threshold points set by $V_{bb1}$ and $V_{bb2}$ determine when the transistor pairs in the non-linear stage begin and end current limiting.

It should be appreciated at this point that, although $V_{bb1}$ is shown as having a higher value than $V_{bb2}$, the characteristic voltages of $V_{bb1}$ and $V_{bb2}$ may be swapped. Such a swapping of voltages results in a transfer function characteristic that bulges upwardly rather than downwardly, as shown at 114 in FIG. 4C. It should also be appreciated that the emitter resistors R8, R9, R13 and R14 may be replaced by tracking controlled DC current sinks to also establish the spreading of the curve between the threshold points on the gamma curve. In addition, it should be appreciated that the emitter stages may be arranged as "T" networks instead of "Pi" networks, with the resistors R8, R9, R13 and R14 being replaced by tracking DC current sinks, to produce the same net effect as described above.

Referring to FIGS. 4A–4D, the characteristic output curves associated with the light valve, the linear amplifier stage 54, the non-linear amplifier stage 56, and the combination of the linear and non-linear stages are shown respectively at 120, 122, 124, and 126. The slope of the curve in the mid-grey level between the threshold points set by $V_{bb1}$ and $V_{bb2}$ is determined by the voltage $V_X$ and can be controlled, as shown at 120, to compensate for individual projector variations.

Referring again to FIG. 2, the voltage output stage 60 includes a DC voltage source $V_{CC}$. Resistors R15, R16 are coupled to the voltage source $V_{CC}$ and to a differential amplifier 130. The resistors R15, R16 provide an output load that turns circuit current into an output differential voltage. The output stage 60 operates as a differential voltage output so that the current from the negative circuit 56a in the non-linear stage results in a voltage that is opposite the positive circuit 56b of the non-linear stage. This differential voltage is applied to the input of differential amplifier 130, which in turn generates a single ended output voltage at 132. The single ended output voltage is then input to the CRT to drive the CRT.

Referring to FIG. 3, actual implementation of the adjustable gamma circuit 12 according to the present invention with a conventional LCLV projector, such as Hughes-JVC projector Model 200, is shown generally at 134. The specific embodiment shown incorporates the black and white grey scale correction circuit disclosed in the Hagerman patent, which has been incorporated by reference, to provide a grey scale correction function. It should be appreciated at this point that additional non-linear amplification stages could be added to the non-linear stage of the present invention, such that the additional stages could be driven by the same input voltage, with the output currents either adding to or subtracting from $V_n$ and $V_p$ of the differential amplifier to add additional non-linear gamma curve shaping.

In operation, a video signal is input into the input stage 52. The signal voltage present at $V_n$ results in complementary signal currents at the collectors of Q1, Q2 that are proportional to $V_{in}$. The non-linear stage effectively creates a slumping of the middle grey level gamma curve which is controlled by the voltage source $V_{XX}$. Typically, the voltage source $V_{XX}$ covers a range of from about −0.7 volts to −5.7 volts, with a compensating $V_{be}$ temperature characteristic that matches the $V_{be}$ of the gamma circuit transistors. At the end points (zero volts or one volt) the differential pairs Q3, Q4 and Q5, Q6 are in a current limiting. The equal but opposite DC currents produced by the differential pairs produce a net zero effect at the output of the differential amplifier 124. Between zero and the middle of the gamma curve DC range, the transistor pair Q5, Q6 comes out of current limiting and have an associated gain which progressively reduces the net gain of the overall circuit up to the point at which the stage returns to current limiting. As the input voltage $V_s$ continues to rise, the transistor pair Q3, Q4 comes out of current limiting and increases the net gain of the overall circuit up to the point at which the transistor Q3, Q4 returns to a current limiting stage. As the two thresholds are set differently for the transistor pairs Q3, Q4 and Q5, Q6, the overall circuit gain is first reduced and then increased, but cancels out above and below the threshold points set by $V_{bb1}$ and $V_{bb2}$. The DC voltage at $V_{XX}$ controls how much the signal deviates from the linear amplification in the mid-level grey region.

Thus, the gamma circuit 12 would be initially preset to exhibit a nominal mid-range compensation level. The projector 10 would be set up as is well known in the art and color balance for the black and white light levels. Subsequently, at the 50% point, the color coordinates would be measured. If required, color balance would be set by adjusting one or more of the red, green or blue gamma adjusted circuits. Having gamma adjust circuits linked to all three light valve controls would double the effective range of control without requiring an extreme middle gamma characteristic, as would be required if one color was fixed.

As can be appreciated from the foregoing description, the adjustable gamma circuit of the present invention allows projector system to compensate for mid-level light non-uniformities particular to a specific projector without the need to repeat the time consuming iterative set up process associated with conventional light valve projectors. The adjustable gamma circuit of the present invention therefore results in sharper images being projected from the projector with less associated adjustment required of the projector. While the adjustable gamma circuit of the present invention has been described for use with non-linear light modulators and image projectors to correct grey scale linearity of the images displayed by such systems, the circuit of the present invention may also be adapted to correct system transfer functions of any systems employing non-linear control. Such systems include sine wave shaping circuits, logarithmic amplifiers, liquid crystal base systems, analog sensor systems, such as a thermal couple based transducer, deflection circuits requiring linearity correction, feedback circuits requiring linearity control, deformable membranes or piezo electric light transducers.

What is claimed is:

1. A gamma correction circuit for a video system, comprising:

an input stage that receives an input video signal;

a linear stage that provides linear gain for the video signal over a predetermined band input range;

a non-linear stage operatively coupled to the linear stage that has a non-linear transfer function and provides a mid-level non-linear gain to the input video signal, the non-linear stage including a first non-linear circuit biased by a first threshold voltage and a second non-linear circuit biased by a second threshold voltage, the first and second threshold voltages defining a non-linear operating range of the transfer function:

an adjustable DC bias voltage source connected to the non-linear stage for controlling the characteristics of the transfer function within the non-linear operating range; and an output stage coupled to both the linear and non-linear stages that outputs a video signal corrected by both the linear and non-linear stages;

the non-linear stage being adjustable over a predetermined middle portion of the given input range by controlling the adjustable DC bias voltage source to compensate for individual projector input level to output level light non-linearities associated with the video system.

2. The gamma correction circuit of claim 1, wherein the first and second non-linear circuits comprise first and second differential amplifier circuits, the first differential amplifier circuit comprising a pair of emitter coupled transistors having a negative associated gain defined by the first threshold voltage, and the second differential amplifier circuit comprising a second pair of emitter coupled transistors having a positive associated gain defined by the second threshold voltage, wherein the first threshold voltage is greater than the second threshold voltage.

3. The gamma correction circuit of claim 2, wherein the linear stage comprises a third differential amplifier circuit including a pair of emitter coupled transistors.

4. The gamma correction circuit of claim 1, wherein the non-linear stage is current limiting at both the high and low levels of the given input levels.

5. The gamma correction circuit of claim 1, wherein the input stage comprises a single input that is converted by the linear stage and the non-linear stage to a differential output.

6. The gamma correction circuit of claim 2, wherein the first and second non-linear circuits provide additional shaping of the grey level portion of the associated transfer function curve.

7. The gamma correction circuit of claim 1, wherein the non-linear stage may be adjustable between the low and high light levels without requiring resetting of the low and high levels.

8. A method of correcting grey level non-linearity in a video image system, comprising the steps of:

balancing projector color for both high and low projector light levels;

measuring projector color coordinates at a predetermined grey level;

providing gamma correction to at least one projector light source to correct for projector light non-linearity characteristics at the grey level to thereby enhance projected color images, said step of gamma correction further comprising setting first and second threshold voltages for defining a non-linear operating range of a gamma transfer function, and adjusting a DC bias voltage for selectively changing the non-linear characteristics of the gamma transfer function within the non-linear operating range.

9. The method of claim 8, wherein the step of measuring the color coordinates at a predetermined grey level comprises measuring the color coordinates at the 50% point in the projector gamma transfer function.

10. The method of claim 8, wherein the step of providing gamma correction to at least one of the projector light sources comprises adjusting one or more of the red, green, or blue projector gamma controls.

11. A video image system, comprising:

a system input that receives an input video signal;

a light source that provides system display light;

a liquid crystal light valve in optical communication with the light source that generates an image from an input video signal and that transfers the image to the system display light, the liquid crystal light valve outputting the image in the system display light as a non-linear function of input video signal level;

system optics in optical communication with the liquid crystal light valve that project the image in the system display light for image display purposes; and a gamma correction circuit coupled to the system input that compensates for mid-grey scale level non-uniformities in a gamma curve, associated with the image generator, at the input video signal, the gamma correction circuit including a non-linear amplifier stage having a first non-linear circuit and a second non-linear circuit, the first non-linear circuit for receiving a first threshold voltage and the second non-linear circuit for receiving a second threshold voltage, the first and second threshold voltages defining a non-linear operating range of the gamma curve, the non-linear amplifier stage being controlled by a DC bias voltage source for controlling the gain of a non-linear transfer function associated with the non-linear amplifier stage.

12. The video image system of claim 11, wherein the gamma correction circuit is an analog circuit.

13. The video image system of claim 12, wherein the gamma correction circuit includes a linear amplification stage.

14. The video image system of claim 10, wherein the first and second non-linear circuits include a first pair of emitter coupled transistors biased at the first threshold voltage, and a second pair of emitter coupled transistors biased at the second threshold voltage, the first and second pairs of emitter coupled transistors being operative to shape the mid-grey scale level of the gamma curve in response to an independently controlled DC biasing voltage.

15. In combination, a gamma correction circuit and a liquid crystal light valve (LCLV) forming a liquid crystal light valve projection system for receiving a source image comprising:

an input stage for receiving an input video signal;

a linear amplifier stage for providing linear gain for the input video signal over a predetermined band input range;

a non-linear amplifier stage connected to the linear amplifier stage having a non-linear transfer function and providing a mid-level non-linear gain to the input video signal, the non-linear stage having a first pair of emitter coupled transistors biased at a first threshold voltage, and a second pair of emitter coupled transistors biased at a second threshold voltage, the first and second pairs of emitter coupled transistors being operative for generating positive and negative gain values for altering the non-linear transfer function, the first and second threshold voltages defining a mid-level non-linear operating range of the transfer function;

an adjustable DC bias voltage source connected to an emitter of each of the first and second pairs of emitter coupled transistors of the non-linear amplifier stage for controlling the gain characteristics of the transfer function within the non-linear operating range; and an output stage coupled to both the linear and non-linear amplifier stages that outputs a video signal corrected by both the linear and non-linear amplifier stages;

the non-linear stage being adjustable over a predetermined middle portion of the given input range by controlling the adjustable DC bias voltage source to compensate for individual projector input level to output level light non-linearities associated with the video system.

16. The system of claim 15 wherein the LCLV projection system includes a CRT for generating the source image, the CRT having inherent non-linear characteristics associated therewith, and wherein the gamma correction circuit is used to reduce the effects of the non-linear characteristics.

17. The system of claim 15 wherein the first threshold voltage is greater than the second threshold voltage for producing a resulting decrease in output gain.

18. The system of claim 15 wherein the first threshold voltage is less that the second threshold voltage for producing a resulting increase in output gain.

19. The system of claim 15 wherein the gamma correction circuit modifies the transfer function for adjusting a grey level for providing correct light levels across the entire grey scale on an input surface of the LCLV.

20. The system of claim 15 wherein the first and second threshold voltages are maintained at a constant predetermined level.

* * * * *